United States Patent
Sugiyama (10) Patent No.: US 12,015,153 B2
(45) Date of Patent: Jun. 18, 2024

(54) METHOD OF PRODUCING CATHODE ACTIVE MATERIAL, AND METHOD OF PRODUCING LITHIUM ION BATTERY

(71) Applicant: TOYOTA JIDOSHA KABUSHIKI KAISHA, Toyota (JP)

(72) Inventor: Issei Sugiyama, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 427 days.

(21) Appl. No.: 17/060,956

(22) Filed: Oct. 1, 2020

(65) Prior Publication Data
US 2021/0119207 A1 Apr. 22, 2021

(30) Foreign Application Priority Data
Oct. 21, 2019 (JP) .................................. 2019-192306

(51) Int. Cl.
*H01M 4/52* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS 9,711,799 B1 * 7/2017 Lai ........................... C25D 3/38
9,774,035 B2 * 9/2017 Barker .................... C01G 53/66
(Continued)

FOREIGN PATENT DOCUMENTS

| CN | 110010886 A | 7/2019 | |
| GB | 2503898 | * 1/2014 | ............ C01G 53/00 |
| WO | 2015/049796 A1 | 4/2015 | |

OTHER PUBLICATIONS

S. Komaba et al., "Structural and electrochemical behaviors of metastable $Li_{2/3}[Ni_{1/3}Mn_{2/3}]O_2$ modified by metal element substitution", Electrochemica Acta, 2009, pp. 2353-2359, vol. 54.
(Continued)

*Primary Examiner* — Maria Laios
*Assistant Examiner* — Angela J Martin
(74) *Attorney, Agent, or Firm* — Sughrue Mion, PLLC (57) ABSTRACT

A main object is to provide a method of producing a cathode active material having a high average discharge potential, and a high degree of stability at high potential. A step of preparing a Na-doped precursor of making a transition metal oxide having a P2 structure belonging to a space group of $P6_3/mmc$; and an ion exchange step of substituting lithium for at least part of sodium contained in the transition metal oxide by an ion exchange method are included, wherein the transition metal oxide has the composition represented by $Na_aMn_{x-p}Ni_{y-q}Co_{z-r}M^1_{p+q+r}O_2$, where $0.5 \leq a \leq 1$, $x+y+z=1$, $3 \leq 4x+2y+3z \leq 3.5$, and $0.05 \leq p+q+r < 0.25$, $M^1$ is Al or Mo, when $M^1$ is Al, p is not equal to q, and any one of p and q is not 0.

7 Claims, 7 Drawing Sheets

Results of X-ray diffraction measurement of cathode active material prepared in Example 1

(51) Int. Cl.
  *H01M 4/50* (2010.01)
  *H01M 4/505* (2010.01)
  *H01M 4/525* (2010.01)
  *H01M 10/05* (2010.01)
  *H01M 10/0525* (2010.01)
  *H01M 10/058* (2010.01)
  *H01M 4/02* (2006.01)

(52) U.S. Cl.
  CPC ..... *H01M 10/0525* (2013.01); *H01M 10/058* (2013.01); *C01P 2002/74* (2013.01); *C01P 2006/40* (2013.01); *H01M 2004/028* (2013.01)

(56) References Cited

U.S. PATENT DOCUMENTS

| | | | |
|---|---|---|---|
| 2004/0081888 A1* | 4/2004 | Thakeray | H01M 4/525 429/223 |
| 2012/0015206 A1* | 1/2012 | Kim | H01M 4/667 428/606 |
| 2012/0107684 A1* | 5/2012 | Iwamoto | H01M 4/134 427/78 |
| 2014/0346048 A1* | 11/2014 | Kohiki | C25D 1/04 205/50 |
| 2015/0214539 A1 | 7/2015 | Barker et al. | |
| 2016/0218365 A1* | 7/2016 | Yamamoto | H01M 4/525 |
| 2020/0014020 A1* | 1/2020 | Lee | H01M 4/1395 |

OTHER PUBLICATIONS

Mickaël Dollé et al., "Layered Manganese Oxide Intergrowth Electrodes for Rechargeable Lithium Batteries. 1. Substitution with Co or Ni," Chem. Mater., 2005, vol. 17, pp. 1036-1043 (8 pages total).

* cited by examiner

Results of X-ray diffraction measurement of cathode active material prepared in Example 1

Fig. 4

Results of X-ray diffraction measurement of cathode active material prepared in Comparative Example 1

Fig. 5

Results of charge-discharge test done for lithium ion battery prepared in Example 1

Fig. 6

Results of charge-discharge test done for lithium ion battery prepared in Example 2

Fig. 7

Results of charge-discharge test done for lithium ion battery
prepared in Comparative Example 1

METHOD OF PRODUCING CATHODE ACTIVE MATERIAL, AND METHOD OF PRODUCING LITHIUM ION BATTERY

FIELD

The present application relates to a method of producing cathode active materials, and a method of producing lithium ion batteries.

BACKGROUND

A layered cathode active material belonging to a space group of P6$_3$mc and having the O2 structure has been conventionally researched. It has been found that a cathode active material having the O2 structure is obtained by synthesizing a Na-doped precursor represented by the composition of Na$_{2/3}$(Ni,Mn,Co)O$_2$ and having the P2 structure in advance, and carrying out an ion exchange of Na contained in this Na-doped precursor for Li.

The reason why an ion exchange is employed is that the O2 structure is a metastable structure, and the most stable structure in a temperature range of room temperature to calcination temperature is the O3 structure, which make it difficult to directly synthesize the O2 structure. In addition, there are few compositions of a Na-doped precursor itself from which the P2 structure is obtained. The ternary system of Ni, Mn and Co limits the composition to such a range that charge neutrality is kept or therearound, as Ni is divalent, Mn is tetravalent and Co is trivalent.

It is thus necessary to keep the foregoing valence balance for doping a different element as keeping the O2 structure. For example, in the case of Al, which tends to be trivalent, it is necessary to reduce Co of the same amount as the doping of Al, or Ni and Mn of half the amount of the doping of Al. S. Komaba et. al., "Structural and electrochemical behaviors of metastable Li2/3[Ni1/3Mn2/3]O2 modified by metal element substitution", Electrochimica Acta 54, 2009, 2353-2359, which will be described later, is also subject to such constraints. It has been believed that the composition range is limited to such a range that the valence balance is kept.

S. Komaba et. al. discloses a method of producing a layered cathode active material of the O2 structure by preparing a precursor such that Al, Co, Fe or Mg is substituted for part of a transition metal in a sodium-containing transition metal oxide of the P2 structure as keeping the valence balance, and carrying out an ion exchange of sodium of the precursor for lithium by the ion exchange method.

SUMMARY

Technical Problem

A layered cathode active material of the O2 structure has the advantage of a small degree of capacity decay even if subjected to the cycle utilizing a high potential of 4.8 V to 5.0 V. In contrast, the average discharge potential of a layered cathode active material of the O2 structure is not sufficient, and the energy density thereof cannot be said to be sufficiently high either.

In S. Komaba et. al., a layered cathode active material of the O2 structure is made by using a precursor such that Al, Co, Fe or Mg is substituted for part of a transition metal, and is applied to a battery, to slightly improve the average discharge potential. However, there is still room for improvement in such a cathode active material.

A major object of the present application is to provide a method of producing a cathode active material having a high average discharge potential, and a high degree of stability at high potential.

Solution to Problem

To solve the foregoing problems, the inventor of the present application thought that not a single-phase of the O2 structure but a multi-phase thereof and another structure can lead to both stability at high potential and sufficiently high energy density.

As a result of various researches, the inventor of the present application found that a transition metal oxide containing at least Na and Mn is used for a precursor that is to be subjected to an ion exchange, and is further doped with a doping element, to intentionally adjust the composition so as not to lead to charge neutrality, which makes it possible to produce a cathode active material having a multi-phase of the O2 structure and the O3 structure by an ion exchange. The cathode active material having a multi-phase of the O2 structure and the O3 structure led to both high potential and a high degree of stability. Based on the findings, the present application will hereinafter disclose aspects to solve the foregoing problems.

That is, the present application discloses, as one aspect to solve the foregoing problems, a method of producing a cathode active material, the method comprising: a step of preparing a Na-doped precursor of making a transition metal oxide having a P2 structure belonging to a space group of P6$_3$/mmc; and an ion exchange step of substituting lithium for at least part of sodium contained in the transition metal oxide by an ion exchange method, wherein the transition metal oxide has the composition represented by Na$_a$Mn$_{x-p}$Ni$_{y-q}$Co$_{z-r}$M$^1_{p+q+r}$O$_2$, where $0.5 \le a \le 1$, $x+y+z=1$, $3 \le 4x+2y+3z \le 3.5$, and $0.05 \le p+q+r < 0.25$, M$^1$ is Al or Mo, when M$^1$ is Al, p is not equal to q, and any one of p and q is not 0.

The present application discloses a method of producing a lithium ion battery, the method comprising: a step of making a cathode active material layer containing the cathode active material produced by the method of producing a cathode active material; and a step of using the cathode active material layer, an anode active material layer containing an anode active material, and an electrolyte layer containing an electrolyte, to arrange the electrolyte layer between the cathode active material layer and the anode active material layer.

In the method of producing a lithium ion battery, the electrolyte layer is preferably a solid electrolyte layer containing a solid electrolyte.

The present application discloses, as one aspect to solve the foregoing problems, a cathode active material, wherein the cathode active material has the composition represented by Li$_b$Na$_c$Mn$_{l-s}$Ni$_{m-t}$Co$_{n-u}$M$^2_{s+t+u}$O$_2$ where $0<b+c \le 1$, $l+m+n=1$, $3 \le 4l+2m+3n \le 3.5$, and $0.05 \le s+t+u < 0.25$, M$^2$ is Al or Mo, when M$^2$ is Al, l is not equal to m, and any one of l and m is not 0, and a O2 structure and a O3 structure coexist in a single particle of the cathode active material.

The present application discloses a lithium ion battery comprising: a cathode active material layer containing the cathode active material; an anode active material layer containing an anode active material; and an electrolyte layer containing an electrolyte, the electrolyte layer arranged between the cathode active material layer and the anode active material layer.

Advantageous Effects

The present disclosure can provide a cathode active material having a high average discharge potential, and a high degree of stability at high potential, and a method of producing the same. A lithium ion battery using the cathode active material produced by the method, and a method of producing the same can be also provided.

DESCRIPTION OF EMBODIMENTS

[Method of Producing Cathode Active Material]

A method of producing a cathode active material which is one aspect of the present disclosure includes: a step of preparing a Na-doped precursor of making a transition metal oxide having a P2 structure belonging to a space group of $P6_3/mmc$; and an ion exchange step of substituting lithium for at least part of sodium contained in the transition metal oxide by an ion exchange method, wherein the transition metal oxide has the composition represented by $Na_aMn_{x-p}Ni_{y-q}Co_{z-r}M^1_{p+q+r}O_2$, where $0.5 \leq a \leq 1$, $x+y+z=1$, $3 \leq 4x+2y+3z \leq 3.5$, and $0.05 \leq p+q+r < 0.25$, $M^1$ is Al or Mo, when $M^1$ is Al, p is not equal to q, and any one of p and q is not 0.

Here, advantages and disadvantages in the case of a single-phase of the O2 or O3 structure will be described. A layered cathode active material having the O2 structure has the advantage of a high degree of stability at high potential, but has the disadvantage of an insufficient average discharge potential. A layered cathode active material having the O3 structure has the advantage of a higher average discharge potential than the O2 structure but has the disadvantage of a low degree of stability at high potential, which leads to a large degree of capacity decay after each cycle.

The cathode active material produced by the foregoing producing method is a layered cathode active material having a multi-phase of the O2 structure and the O3 structure. A cathode active material having a multi-phase of the O2 structure and the O3 structure as described above can overcome the disadvantage the O2 structure and the O3 structure each has, and further can enjoy the advantage thereof. The present disclosure can thus provide a method of producing a cathode active material which can provide a cathode active material having a high average discharge potential, and a high degree of stability at high potential.

Hereinafter the method of producing a cathode active material will be further described.

<Step of Preparing Na-Doped Precursor>

In the step of preparing a Na-doped precursor, a transition metal oxide having a P2 structure belonging to a space group of $P6_3/mmc$. The transition metal oxide has the composition represented by $Na_aMn_{x-p}Ni_{y-q}Co_{z-r}M^1_{p+q+r}O_2$, where $0.5 \leq a \leq 1$, $x+y+z=1$, $3 \leq 4x+2y+3z \leq 3.5$, and $0.05 \leq p+q+r < 0.25$, $M^1$ is Al or Mo, when $M^1$ is Al, p is not equal to q, and any one of p and q is not 0.

The way of making the transition metal oxide is not particularly limited, and the transition metal oxide can be made by any known method. For example, the transition metal oxide may be made as follows: first, a Mn source, a Ni source and a Co source are mixed at such a proportion as to lead to a desired composition, and to be precipitated using a base; then a Na source is added to the precipitated powder at such a proportion as to lead to a desired composition, to be calcined. At this time, a M source such as Al is mixed together with the Mn source, the Ni source and the Co source, or together with the Na source so as to lead to a desired composition. Precalcination may be carried out before the calcination. This makes it possible to obtain the transition metal oxide, which is a Na-doped precursor.

Here, each of the Mn source, the Ni source, the Co source and the M source can be a nitrate, a sulfate, a hydroxide, a carbonate, or the like of a corresponding metal element, which may be a hydrate. The base used for the precipitation can be sodium carbonate or sodium hydroxide, which may be used in the form of an aqueous solution. Further, an ammonia solution or the like may be added for adjusting basicity. The Na source can be sodium carbonate, sodium oxide, sodium nitrate, sodium hydroxide, or the like. The calcination can be performed at a temperature of 700° C. to 1100° C. Na is not sufficiently doped at a temperature lower than 700° C. Not the P2 structure but the O3 structure is formed at a temperature higher than 1100° C. The temperature is preferably 800° C. to 1000° C. A temperature when the precalcination is performed is equal to or lower than the calcination temperature. For example, the precalcination can be performed approximately at 600° C.

The specific structure of the transition metal oxide is, for example, as follows: the transition metal oxide has the P2 structure belonging to a space group of $P6_3/mmc$, and has the composition represented by $Na_aMn_{x-p}Ni_{y-q}Co_{z-r}M^1_{p+q+r}O_2$ where $0.5 \leq a \leq 1$, $x+y+z=1$, $3 \leq x+2y+3z \leq 3.5$, and $0.05 \leq p+q+r < 0.25$. $M^1$ is Al or Mo. The composition of the transition metal oxide can be confirmed, for example, by X-ray diffraction (XRD).

Here, the Na doping is within a range such that the P2 structure is formed when there is no doping element ($M^1$) (when each of p, q and r is 0), and that charge neutrality is kept. The Na doping of less than 0.5 may lead to failure in synthesis of the P2 structure.

When $M^1$ is Al, p is not equal to q, and one of p and q is not 0. p, q and r are each set within a range such that charge neutrality cannot be kept in the transition metal oxide when Al are trivalent. Because Mo is assumed to be hexavalent, charge neutrality cannot be kept irrelevantly to the values of p, q and r when $M^1$ is Mo. The range of p+q+r is such as to be enough to contribute to the formation of the structure, and such that the composition derived therefrom is not over that derived from the three main constituent elements of Mn, Ni and Co. p+q+r of less than 0.05 may lead to a solid solution of $M^1$ in the ion exchange step, to keep the O2 structure. p+q+r of at least 0.25 may reduce battery capacity.

<Ion Exchange Step>

The ion exchange step is a step of substituting lithium for at least part of sodium contained in the transition metal oxide by the ion exchange method, and is carried out after the step of preparing a Na-doped precursor.

In the ion exchange step, lithium is substituted for at least part of sodium contained in the transition metal oxide, using the ion exchange method. Sodium exchanged for lithium is preferably as much as possible. Lithium is more preferably substituted for at least 99% of sodium contained in the transition metal oxide. At least 99% is set in view of the measurement limits of measurement equipment such as ICP (at most 1%). Thus, the state where lithium is substituted for at least 99% of sodium means the state where Na is not detected when the composition after the ion exchange is measured by means of ICP or the like.

A Li ion source used in the ion exchange step is not particularly limited, and any known lithium ion source used for the ion exchange method may be used. Examples thereof include lithium salts such as lithium chloride, lithium bromide, and lithium nitrate, mixtures thereof, and Li-containing aqueous solutions containing a lithium salt (such as lithium chloride aqueous solutions, and lithium hydroxide aqueous solutions containing lithium chloride). A mixture of lithium salts is preferably used. Lithium salts that can be mixed in the mixture of lithium salts are not particularly limited. Examples of the mixture include mixtures of lithium chloride and lithium nitrate. Since mixing at least two lithium salts as described above can lower the melting point of the mixture, heating temperature can be lowered when the ion exchange is performed in a way of using heating as described later. When a mixture of lithium salts is used, the mixing ratio is not particularly limited either, and is different according to lithium salts to be used. For example, when a mixture of lithium chloride and lithium nitrate is used, the molar ratio is such that lithium nitrate:lithium chloride is preferably 70:30 to 95:5, and more preferably 80:20 to 90:10.

Examples of the way of making an ion exchange reaction progress include a way of using heat, and a way of using the difference in concentration. Either way may be used in the method of producing a cathode active material.

The way of using heat is a way of adding the Li ion source to the transition metal oxide, and heating the resultant, to make the ion exchange reaction progress. Using heat makes it possible to realize a desired ion exchange reaction for a short time. Examples of the Li ion source include a pure solid phase of lithium chloride, and mixtures of lithium salts constituted of lithium chloride, lithium bromide, lithium nitrate, etc. which are to be molten salt bases. The heating temperature is at least equal to or higher than the melting point of the Li ion source. When a mixture of lithium salts (such as a mixture of lithium chloride and lithium nitrate) is used, the heating temperature is preferably at most 400° C. because the heating temperature of at least 400° C. entirely changes the O2 structure to the O3 structure, which is a stable phase, for approximately 1 hour. The heating temperature is preferably at most 350° C. The lower limit is preferably at least 100° C. in view of a time taken for the ion exchange.

The heating time is not particularly limited as long as the transition metal oxide can be changed to a layered cathode active material having a multi-phase of the O2 structure and the O3 structure. The heating time is within the range of 30 minutes to 10 hours, and among them, is preferably 30 minutes to 2 hours.

The amount of the Li ion source is preferably set so that as the ratio of the amounts of the transition metal oxide and the Li ion source to be used, Li contained in the Li ion source is 1.1 times to 15 times, preferably 3 times to 15 times, more preferably 5 times to 15 times, and further preferably 8 times to 12 times as much as the transition metal oxide in terms of molar ratio.

The way of using the difference in concentration is a way of making the concentration of Li contained in a Li-containing solution sufficiently high, to make the ion exchange reaction progress. This way has the advantage of a wide selection of materials because not needing heating. The Li ion source can be a Li-containing solution such as a lithium chloride aqueous solution and a lithium hydroxide aqueous solution containing lithium chloride. The concentration of Li contained in the Li-containing solution is not particularly limited, and is usually within the range of 1 mol % to 10 mol %, and among them, is preferably within the range of 4 mol % to 6 mol %. The reaction time is different according to the transition metal oxide etc., and is usually within the range of 10 hours to 300 hours, and among them, is preferably 100 hours to 150 hours. Both heat and the deference in concentration may be used together, to make the ion exchange reaction progress.

The ratio of the transition metal oxide and the Li-containing solution to be used is different according to the concentration of Li contained in the Li-containing solution etc. For example, the Li-containing solution is preferably used within the range of 0.5 L to 1 L, and more preferably used within the range of 0.7 L to 0.8 L, to 100 g of the transition metal oxide because the foregoing range can efficiently make the ion exchange reaction progress.

<Other Steps>

The method of producing a cathode active material may include a step of pulverizing a cathode active material after the ion exchange step because the cathode active material is adjusted to have a desired shape and particle diameter when applied to a lithium ion battery. The pulverization can be carried out by, for example, ball milling by means of a ball mill.

[Cathode Active Material]

Figure 1:
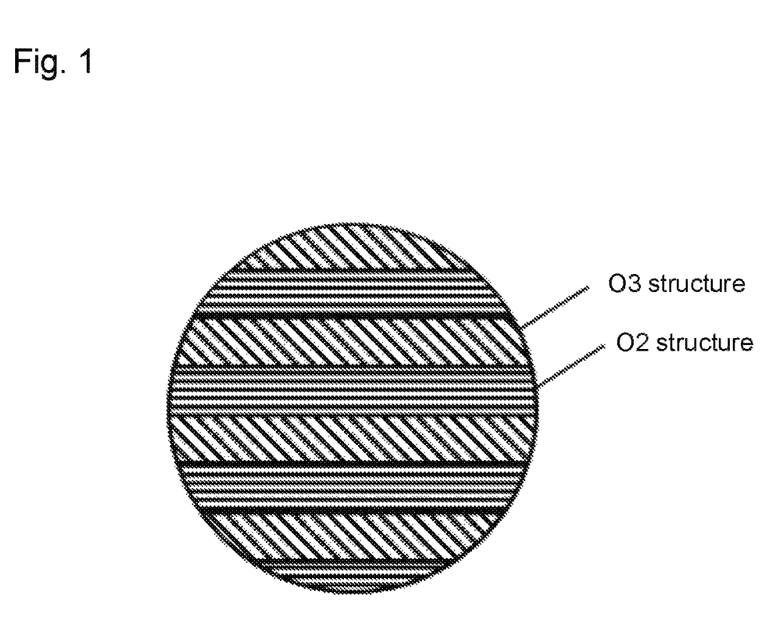
FIG. 1 is a schematic view of a surface of a cathode active material particle where a multi-phase of the O2 structure and the O3 structure is formed.

The cathode active material produced by the method of producing a cathode active material will be described. The cathode active material is a layered cathode active material having a multi-phase of the O2 structure (crystal structure is P6$_3$mc) and the O3 structure (crystal structure is R-3m) in a single particle thereof. The multi-phase of the O2 structure and the O3 structure is specifically such that the O2 structure and the O3 structure coexist in the layered direction (c-axis direction, [001]) in a single particle. FIG. 1 is a schematic view of a surface of a cathode active material particle where the multi-phase of the O2 structure and the O3 structure is formed.

It can be confirmed, for example, by X-ray diffraction measurement using Cu-Kα radiation that the cathode active material has the multi-phase of the O2 structure and the O3 structure. According to the X-ray diffraction measurement, there is the peak derived from the O2 structure 100 within the range of 2θ at 35° to 38°, and there is the peak derived from the O3 structure 104 within the range of 2θ at 43° to 46°. Since the cathode active material has the multi-phase of the O2 structure and the O3 structure, the peaks thereof can be confirmed by X-ray diffraction measurement. These peaks can be particularly confirmed when the cathode active material has the composition described later. The multi-phase of the O2 structure and the O3 structure can be also identified by selected area diffraction patterns or high-resolution images obtained using a transmission electron microscope, or by images obtained using a scanning transmission electron microscope.

The proportion of the O2 structure and the O3 structure in the cathode active material is preferably such that the abundance of O2 structure/O3 structure is 0.1 to 3.0. This leads to a cathode active material having a further high average discharge potential, and a high degree of stability at high potential.

Here, the abundance of O2 structure/O3 structure means a ratio of the maximum strength of the peak derived from the O2 structure 002 to that of the peak derived from the O3 structure 003 in the results of X-ray diffraction measurement. Since fluctuating according to the composition, the positions of these peaks cannot be described accurately. The person skilled in the art however can identify the positions. For example, the peak derived from the O2 structure 002 exists within the range of 2θ at 17.0° to 19.0°; and the peak derived from the O3 structure 003 exists within the range of 2θ at 16.5° to 18.5°. When the compositions of the O2 structure and the O3 structure are the same, the peak derived from the O3 structure 003 appears on a lower angle side than the peak derived from the O2 structure 002.

The foregoing range of the abundance of O2 structure/O3 structure is set for the following reason. As described above, the O3 structure has a higher average discharge potential than the O2 structure. Thus, the presence of the O3 structure improves the average potential. Assuming that the average potential is the weighted average of the average potentials of the O3 structure and the O2 structure by the abundance thereof, the abundance of O2 structure/O3 structure has to be at most 3.0 for expressing the average potential equal to or higher than that of the O3 structure. In contrast, it is believed that shears generated by the difference between lattice constants due to contact of the O2 structure with the O3 structure causes the O2 structure to bring about stabilization of the O3 structure. Thus, the O2 structure of (a) single or more layer(s) has to exist within the range of approximately 10 nm from the O3 structure where shears are eased, for making this sufficiently effective. Therefore, the abundance of O2 structure/O3 structure has to be at least 0.1.

The cathode active material has the composition represented by $Li_bNa_cMn_{1-s}Ni_{m-t}Co_{n-u}M^2_{s+t+u}+O_2$ where $0<b+c\leq1$, $1+m+n=1$, $3\leq4l+2m+3n\leq3.5$, and $0.05\leq s+t+u<0.25$, $M^2$ is Al or Mo, when $M^2$ is Al, 1 is not equal to m, and any one of 1 and m is not 0.

c is preferably as small as possible, and more preferably at most 0.01. c is at most 0.01 when lithium is substituted for almost entire sodium in the sodium-containing transition metal oxide, which is a precursor. In this case, writing of Na may be omitted. The composition of the cathode active material excluding Li and Na basically corresponds to the composition of the transition metal oxide, which is a precursor ($M^2$ corresponds to $M^1$ of the transition metal oxide). The composition of the cathode active material can be confirmed by, for example, X-ray diffraction (XRD).

The cathode active material is preferably in the form of a particle. The average particle diameter of the cathode active material is, for example, within the range of 1 nm to 100 μm, and among them, preferably within the range of 10 nm to 30 μm.

[Method of Producing Lithium Ion Battery]

A method of producing a lithium ion battery using the cathode active material produced by the method of producing a cathode active material of the present disclosure will be described.

Figure 2:
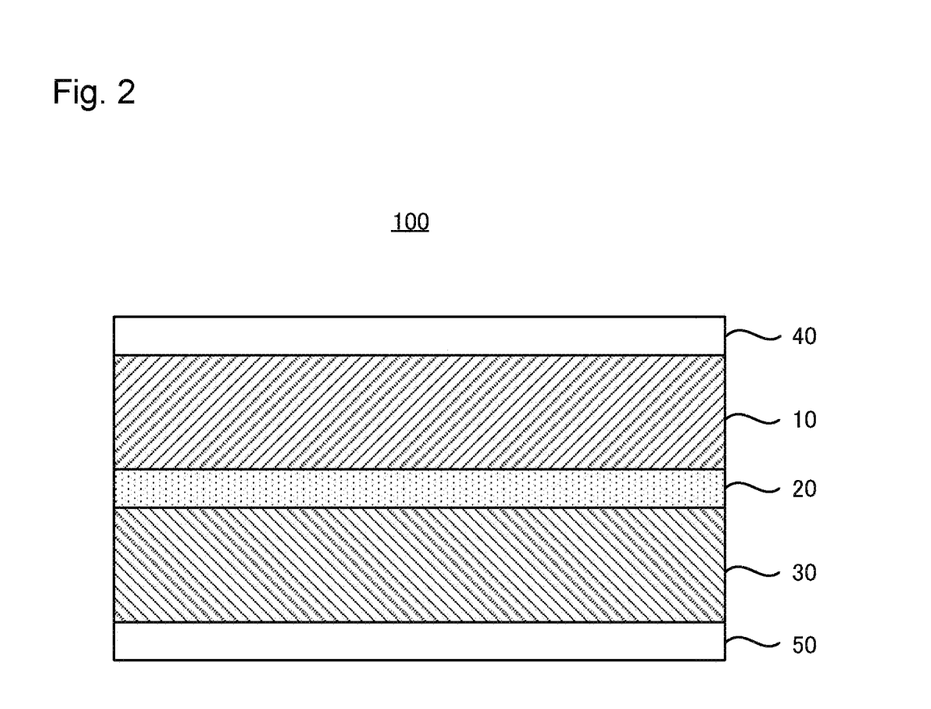
FIG. 2 is a schematic cross-sectional view of a lithium ion battery 100.

The method of producing a lithium ion battery, which is one aspect of the present disclosure, includes: a step of making a cathode active material layer 10 containing the cathode active material produced by the method of producing a cathode active material (hereinafter may be referred to as "step S1"); and a step of using the cathode active material layer 10, an anode active material layer 30 containing an anode active material, and an electrolyte layer 20 containing an electrolyte, to arrange the electrolyte layer 20 between the cathode active material layer 10 and the anode active material layer 30 (hereinafter may be referred to as "step S2"). FIG. 2 shows a schematic cross-sectional view of a lithium ion battery 100 that is one example of a lithium ion battery produced by the method of producing a lithium ion battery of the present disclosure. Hereinafter description thereof will be given with reference to FIG. 2.

The method of producing a lithium ion battery of the present disclosure makes it possible to produce a lithium ion battery having a high average discharge potential, and a high degree of stability at high potential since the produced lithium ion battery includes the cathode active material layer containing the cathode active material produced by the method of producing a cathode active material of the present disclosure.

<Step S1>

Step S1 is a step of making the cathode active material layer 10 containing the cathode active material produced by the method of producing a cathode active material of the present disclosure. The way of making the cathode active material layer 10 is not particularly limited. The cathode active material layer 10 can be made by any known way: that is, may be made in a wet condition or may be made in a dry condition. For example, one may disperse materials to constitute the cathode active material layer 10 in an organic solvent to make a slurry, apply the slurry onto a cathode current collector 40, and dry to form the cathode active material layer 10. Or, one may mix materials to constitute the cathode active material layer 10 in a dry condition, and carry out press molding to form the cathode active material layer 10.

(Cathode Active Material Layer 10)

The material constituting the cathode active material layer 10 include at least the cathode active material produced by the method of producing a cathode active material. The materials may optionally include a binder, a conductive material, and a solid electrolyte. The thickness of the cathode active material layer 10 is not particularly limited but suitably adjusted according to the structure of the battery, and is preferably within the range of 0.1 μm to 1 mm.

(Cathode Active Material)

The foregoing cathode active material is used for the cathode active material here. The content of the cathode active material in the cathode active material layer 10 is not particularly limited. For example, the cathode active material is preferably contained in an amount of 60 mass % to 99 mass %, which is more preferably 70 mass % to 95 mass %, when the total mass of the cathode active material layer 10 is 100 mass %.

(Binder)

The binder is not particularly limited as long as being chemically and electrically stable. Examples thereof include fluorine-based binding materials such as polyvinylidene fluoride (PVDF) and polytetrafluoroethylene (PTFE), rubber-based binding materials such as styrene-butadiene rubber (SBR), olefinic binding materials such as polypropylene (PP) and polyethylene (PE), and cellulose-based binding materials such as carboxymethyl cellulose (CMC). The content of the binder in the cathode active material 10 is not particularly limited, but is preferably within the range of 1 mass % to 40 mass %.

(Conductive Material)

The conductive material is not particularly limited, and any known one as a conductive material for lithium ion batteries may be employed. Examples thereof include carbon materials. Carbon materials include acetylene black, Ketjenblack, VGCF (vapor-grown carbon fiber), and graphite. The content of the conductive material in the cathode active material 10 is not particularly limited, but is preferably within the range of 5 mass % to 40 mass %, and more preferably within the range of 10 mass % to 40 mass %.

(Solid Electrolyte)

The solid electrolyte is not particularly limited as long as having desired ionic conductivity. Examples thereof include oxide solid electrolytes and sulfide solid electrolytes. Examples of oxide solid electrolytes include lithium lanthanum zirconate, LiPON, $Li_{1+x}Al_xGe_{2-x}(PO_4)_3$, Li—SiO-based glasses, and Li—Al—S—O-based glasses. Examples of sulfide solid electrolytes include $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$ and $Li_2S$—$P_2S_5$—$GeS_2$. The solid electrolyte may be amorphous, and may be crystalline. The solid electrolyte is preferably in the form of a particle. The average particle diameter of the solid electrolyte is, for example, within the range of 1 nm to 100 μm, and among them, preferably within the range of 10 nm to 30 μm. The content of the solid electrolyte in the cathode active material layer 10 is not particularly limited, but preferably within the range of 1 mass % to 40 mass %.

<Step S2>

Step S2 is a step of using the cathode active material layer 10, the anode active material layer 30 containing an anode active material, and the electrolyte layer 20 containing an electrolyte, to arrange the electrolyte layer 20 between the cathode active material layer 10 and the anode active material layer 30. While the way of arranging these layers is different according to the aspect of the electrolyte layer 20, these layers may be arranged by any known way. For example, when the electrolyte layer 20 is a liquid electrolyte layer, one may arrange a separator (such as a porous separator made from PP) between the cathode active material layer 10 and the anode active material layer 30, fill a place where the separator is arranged with a liquid electrolyte, to make the electrolyte layer. Or, when the electrolyte layer 20 is a solid electrolyte layer, one may stack the layers so as to arrange the solid electrolyte layer between the cathode active material layer 10 and the anode active material layer 30, and apply a load to press them as necessary.

(Electrolyte Layer 20)

The electrolyte layer 20 is a layer arranged between the cathode active material layer 10 and the anode active material layer 30, and contains at least an electrolyte. The electrolyte layer 20 conducts ions between the cathode active material and an anode active material via the electrolyte contained therein. The aspect of the electrolyte layer 20 is not particularly limited. The electrolyte layer 20 may be a liquid electrolyte layer, a gel electrolyte layer, a solid electrolyte layer, or the like. Among them, the electrolyte layer 20 is preferably the solid electrolyte layer containing the solid electrolyte.

The liquid electrolyte layer is usually a layer formed by using a nonaqueous electrolyte solution. The nonaqueous electrolyte solution usually contains a supporting salt and a nonaqueous solvent. The supporting salt dissociates in the solvent, to generate a charge carrier (lithium ion). Examples of the supporting salt include fluorine-containing lithium salts such as $LiPF_6$ and $LiBF_4$. Examples of the nonaqueous solvent include nonfluorine or fluorine-containing carbonates. The carbonates include cyclic carbonates such as ethylene carbonate (EC), propylene carbonate (PC), and monofluoroethylene carbonate (FEC), and linear carbonates such as dimethyl carbonate (DMC), ethyl methyl carbonate (EMC), and methyl 2,2,2-trifluoroethyl carbonate (MT-FEC). For example, the nonaqueous electrolyte solution may contain one or two or more optional components as necessary, in addition to the foregoing supporting salt and nonaqueous solvent.

For example, the gel electrolyte layer can be obtained by adding a polymer to a nonaqueous electrolyte solution to gelatinate the nonaqueous electrolyte solution. Specifically, a polymer such as polyethylene oxide (PEO), polyacrylonitrile (PAN) or polymethyl methacrylate (PMMA) can be added to the nonaqueous electrolyte solution to gelatinate the nonaqueous electrolyte solution.

The solid electrolyte layer is a layer formed by using a solid electrolyte. The solid electrolyte is not particularly limited as long as having Li ion conductivity. Examples thereof include oxide solid electrolytes and sulfide solid electrolytes. Examples of oxide solid electrolytes include lithium lanthanum zirconate, LiPON, $Li_{1+x}Al_xGe_{2-x}(PO_4)_3$, Li—SiO-based glasses, and Li—Al—S—O-based glasses. Examples of sulfide solid electrolytes include $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$ and $Li_2S$—$P_2S_5$—$GeS_2$. The solid electrolyte may be amorphous, and may be crystalline. The solid electrolyte is preferably in the form of a particle. The average particle diameter of the solid electrolyte is, for example, within the range of 1 nm to 100 μm, and among them, preferably within the range of 10 nm to 30 μm.

The content of the solid electrolyte in the solid electrolyte layer is preferably at least 80.0 mass %, more preferably at least 90.0 mass %, further preferably at least 95.0 mass %, and further preferably at least 99.0 mass %, when the total mass of the solid electrolyte layer is defined as 100 mass %. The upper limit is not particularly limited. The solid electrolyte layer may be formed of the solid electrolyte only.

The solid electrolyte layer may contain a binder to bind solid electrolyte particles to each other in view of the development of plasticity etc. The foregoing binder may be used as the binder here. In view of the prevention of low ionic conductivity of the solid electrolyte layer, the content of the binder is preferably at most 20 mass %, more preferably at most 10 mass %, further preferably at most 5 mass %, and further preferably at most 1 mass %, when the total mass of the solid electrolyte layer is defined as 100 mass %.

The thickness of the solid electrolyte layer is suitably adjusted according to the structure of the battery, and is usually, but is not particularly limited to, 0.1 μm to 1 mm.

Examples of the way of forming such a solid electrolyte layer may include pressure molding on a powder of materials of the solid electrolyte layer including the solid electrolyte, and other components as necessary, to form the solid electrolyte layer. As another way thereof, one may apply a slurry for the solid electrolyte layer which contains the binder onto a support, dry up the slurry for the solid electrolyte layer, and remove the support, to form the solid electrolyte layer.

(Anode Active Material Layer 30)

The anode active material layer 30 contains at least an anode active material, and may optionally contain a binder, a conductive material, and a solid electrolyte. The thickness of the anode active material layer 30 is not particularly limited but suitably adjusted according to the structure of the battery, and is preferably within the range of 0.1 μm to 1 mm.

(Anode Active Material)

Any known anode active material used for lithium ion batteries may be used as the anode active material. For example, a silicon-based active material such as Si, Si alloys, and silicon oxide; a carbon-based active material such as graphite and hard carbon; any oxide-based active material such as lithium titanate; lithium metal or a lithium alloy; or the like may be used. The content of the anode active material in the anode active material layer 30 is not particularly limited. For example, the anode materials are preferably contained in an amount of at least 60 mass %, which is more preferably at least 70 mass %, and further preferably at least 80%, when the total mass of the anode active material layer 30 is defined as 100 mass %. The upper limit of the content of the anode materials is not particularly limited, and the anode active material layer 30 may consist of the anode materials. In view of the content of optional components, the anode active material layer 30 may contain in an amount of at most 99 mass % of the anode materials, which may be at most 95 mass %

The same ones, which may be employed for the cathode active material layer 10, may be employed for a conductive material and a binder that may be contained in the anode active material layer 30. They are optional components, and the contents thereof are not particularly limited either. The configuration thereof may be the same as in the cathode active material layer 10.

The way of making the anode active material layer 30 is not particularly limited. The anode active material layer 30 can be easily made in a dry or wet condition as well as the cathode active material layer 10.

<Other Steps>

The method of producing a lithium ion battery may further include a step of arranging the cathode current collector 40 on a face of the cathode active material layer 10 which is on the opposite side where the electrolyte layer 20 is arranged (hereinafter may be referred to as "step S3"), and a step of arranging an anode current collector 50 on a face of the anode active material layer 30 which is on the opposite side where the electrolyte layer 20 is arranged (hereinafter may be referred to as "step S4"). Steps S3 and S4 may be carried out after step S2, or may be carried out before step S2. Step S3 may be carried out as being included in step S2 (step S4 may be done as being included in step S2) since one can make materials to constitute the cathode active material layer 10 (anode active material layer 30) a slurry, and apply the slurry to the cathode current collector 40 (anode current collector 50), to make the cathode active material layer 10 (anode active material layer 30).

(Cathode Current Collector 40)

Examples of the material of the cathode current collector 40 include SUS, aluminum, nickel, iron, titanium, and carbon. The cathode current collector 40 may be, for example, in the form of foil, in the form of mesh, or in a porous form. Stacking the cathode current collector 40 onto the cathode active material layer 10 makes it possible to easily make a cathode. The cathode current collector 40 may be omitted according to the materials contained in the cathode active material layer 10. In this case, the cathode active material layer 10 itself is the cathode.

(Anode Current Collector 50)

Examples of the material of the anode current collector 50 include SUS, aluminum, nickel, copper, and carbon. The anode current collector 50 may be, for example, in the form of foil, in the form of mesh, or in a porous form. Stacking the anode current collector 50 onto the anode active material layer 30 makes it possible to easily make an anode. The anode current collector 50 may be omitted according to the materials contained in the anode active material layer 30. In this case, the anode active material layer 30 itself is the anode.

A step of sealing a lithium ion battery into a case or the like may be further included. A general battery case may be used as the case without any particular limitations. Examples thereof include a battery case made of SUS.

[Lithium Ion Battery]

The lithium ion battery produced by the method of producing a lithium ion battery is as described above: that is, as one example shown in FIG. 2, is the lithium ion battery 100 including the cathode active material layer 10 containing the cathode active material of the present disclosure, the anode active material layer 30 containing the anode active material, and the electrolyte layer 20 containing the electrolyte, which is arranged between the cathode active material layer 10 and the anode active material layer 30. The electrolyte layer 20 is preferably the solid electrolyte layer containing the solid electrolyte.

As described above, in the lithium ion battery 100, the cathode current collector 40 may be arranged on a face of the cathode active material layer 10 which is on the opposite side where the electrolyte layer 20 is arranged, and the anode current collector 50 may be arranged on a face of the anode active material layer 30 which is on the opposite side where the electrolyte layer 20 is arranged. Further, the lithium ion battery 100 may be sealed into the case or the like.

The lithium ion battery 100 may be a primary battery, and may be a secondary battery. The lithium ion battery 100 is preferably a secondary battery in view of a more effective improvement in durability. This is because secondary batteries can be repeatedly charged and discharged, and are useful for, for example, automotive batteries. Secondary batteries include batteries used as a primary battery (used for the purpose of discharging once after charging). The lithium ion battery 100 may be, for example, in the form of a coin, a laminate, a cylinder, or a rectangle.

EXAMPLES

[Making Lithium Ion Battery]

Example 1

(Synthesizing Na-Doped Precursor)

$Mn(NO_3)_2 \cdot 6H_2O$, $Ni(NO_3)_2 \cdot 6H_2O$, $Co(NO_3)_2 \cdot 6H_2O$, and $Al(NO_3)_3 \cdot 9H_2O$ as raw materials were dissolved in pure water so that the molar ratio of Mn, Ni, Co and Al was 4:2:3:1. A $Na_2CO_3$ solution of 12 wt % in concentration was prepared. These two solutions were titrated in a beaker at the same time. At that time, the titrimetric rate was controlled so that pH was at least 7.0 and lower than 7.1. After the titration, the mixed solution was stirred for 24 hours under the conditions of 50° C. and 300 rpm. The obtained reaction product was washed by pure water, and only a precipitated powder was separated by centrifugation. The obtained powder of a precursor was dried under the conditions of 120° C. and 48 hours, and thereafter crushed in an agate mortar.

$Na_2CO_3$ was added to the obtained powder of a precursor to be mixed so that the composition ratio was $Na_{0.8}Mn_{0.4}Ni_{0.2}Co_{0.3}Al_{0.1}O_2$. The mixed powder was pressed at a load of 2 ton by cold isostatic pressing, to make a pellet. The obtained pellet was precalcined in the atmospheric air under the conditions of 600° C. and 6 hours, and thereafter calcined under the conditions of 900° C. and 24 hours, to synthesize a Na-doped precursor $(Na_{0.8}Mn_{0.4}Ni_{0.2}Co_{0.3}Al_{0.1}O_2)$.

(Ion Exchange Step)

LiNO$_3$ and LiCl were mixed so that the molar ratio was 88:12, and the mixed powder was weighed so that the amount of Li contained in the mixed powder was 10 times as much as that of the Na-doped precursor in terms of molar ratio. The Na-doped precursor and the mixed powder were mixed, and heated in the atmospheric air under the conditions of 280° C. and 1 hour, to be subjected to an ion exchange. After the ion exchange, water was added to dissolve the residual salts, and further a rinse is given to obtain a cathode active material (Li$_{0.7}$Mn$_{0.4}$Ni$_{0.2}$Co$_{0.3}$Al$_{0.1}$O$_2$) which was a material to be aimed. The obtained cathode active material was subjected to ball milling, to be a powder.

(Making Lithium Ion Battery)

Into a 125 mL n-methylpyrrolidone solution that was a solvent of dissolving 5 g of polyvinylidene fluoride (PVDF), which was a binding material, 85 g of the obtained cathode active material, and 10 g of carbon black, which was a conductive material, were introduced, to be kneaded until being uniformly mixed, to make a paste. This paste was applied to one face of a Al current collector having a thickness of 15 μm so that the weight thereof was 6 mg/cm$^2$, to have the paste having a thickness of 45 μm and density of 2.4 g/cm$^3$, to obtain an electrode. At last, this electrode was cut out so as to have a diameter of 16 mm, to obtain a cathode.

Li foil was cut out so as to have a diameter of 19 mm, to obtain an anode.

Coin cell, CR2032 was made using the obtained cathode and anode. A porous separator made from PP was used as a separator. EC (ethylene carbonate) and DMC (dimethyl carbonate) were mixed so as to have the volume ratio of 3:7, and lithium hexafluorophosphate (LiPF$_6$) was dissolved in the mixture as a supporting salt so as to have a concentration of 1 mol/L, which was used as an electrolyte solution.

Example 2

A cathode active material (Li$_{0.7}$Mn$_{0.4}$Ni$_{0.2}$Co$_{0.3}$Mo$_{0.1}$O$_2$) and a lithium ion battery according to Example 2 were made in the same manner as in Example 1 except that Mn(NO$_3$)$_2$·6H$_2$O, Ni(NO$_3$)·6H$_2$O, and Co(NO$_3$)$_2$·6H$_2$O as raw materials were weighed so that the molar ratio of Mn, Ni and Co was 4:2:3, to make a powder of a precursor, and when Na$_2$CO$_3$ and the powder of a precursor were mixed, MoO$_3$ was also mixed therewith so that the composition ratio of the Na-doped precursor was Na$_{0.8}$Mn$_{0.4}$Ni$_{0.2}$Co$_{0.3}$Mo$_{0.1}$O$_2$.

Comparative Example 1

A cathode active material (Li$_{0.7}$Mn$_{0.5}$Ni$_{0.2}$Co$_{0.3}$O$_2$) and a lithium ion battery according to Comparative Example 1 were made in the same manner as in Example 1 except that Mn(NO$_3$)$_2$·6H$_2$O, Ni(NO$_3$)·6H$_2$O, and Co(NO$_3$)$_2$·6H$_2$O as raw materials were weighed so that the molar ratio of Mn, Ni and Co was 5:2:3, to make a powder of a precursor.

[Evaluation]

<X-Ray Diffraction Measurement>

Figure 3:
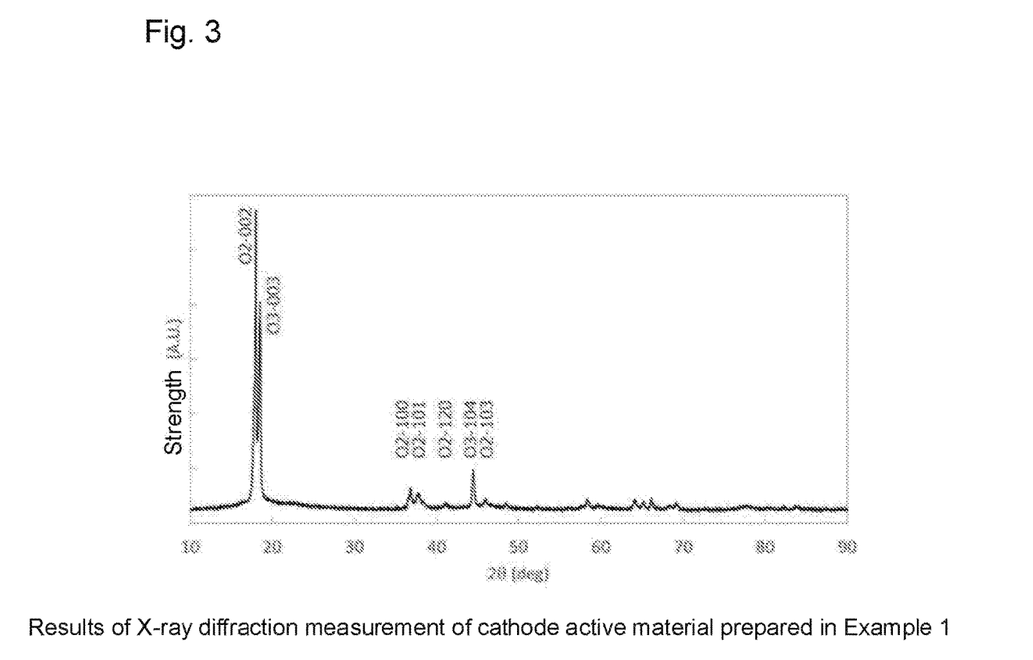
FIG. 3 shows the results of X-ray diffraction measurement of a cathode active material prepared in Example 1.
Figure 4:
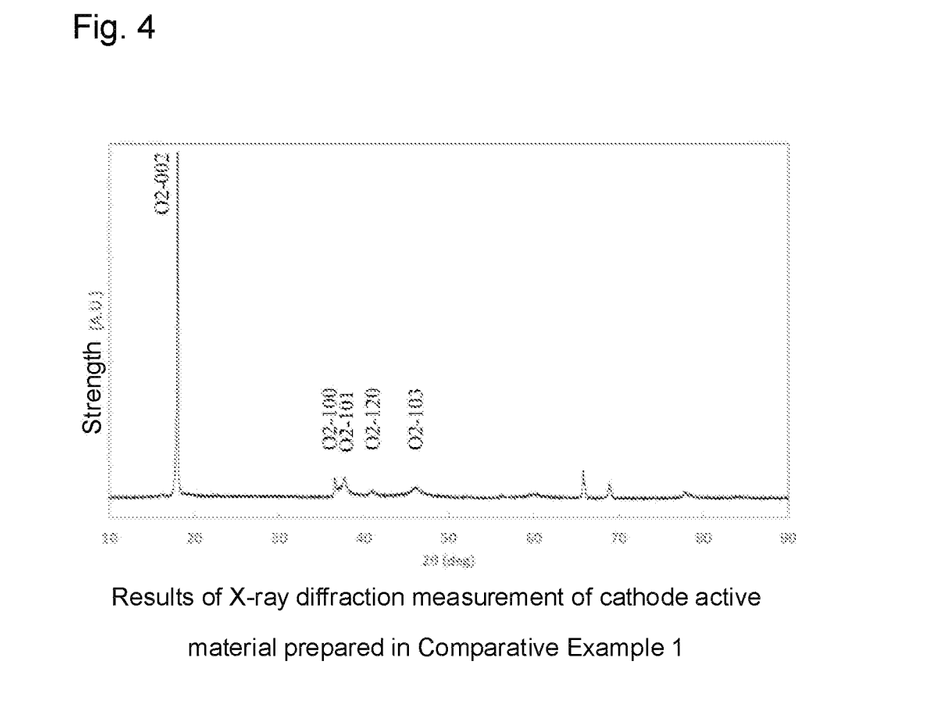
FIG. 4 shows the results of X-ray diffraction measurement of a cathode active material prepared in Comparative Example 1.

X-ray diffraction measurement was taken on the cathode active materials synthesized in Example 1 and Comparative Example 1. The results are shown in FIGS. 3 and 4. As shown in FIG. 3, it is found that the O2 structure and the O3 structure coexisted in the cathode active material made in Example 1. In contrast, as shown in FIG. 4, it is found that a single phase of the O2 structure was obtained in Comparative Example 1.

<Charge-Discharge Test>

Figure 5:
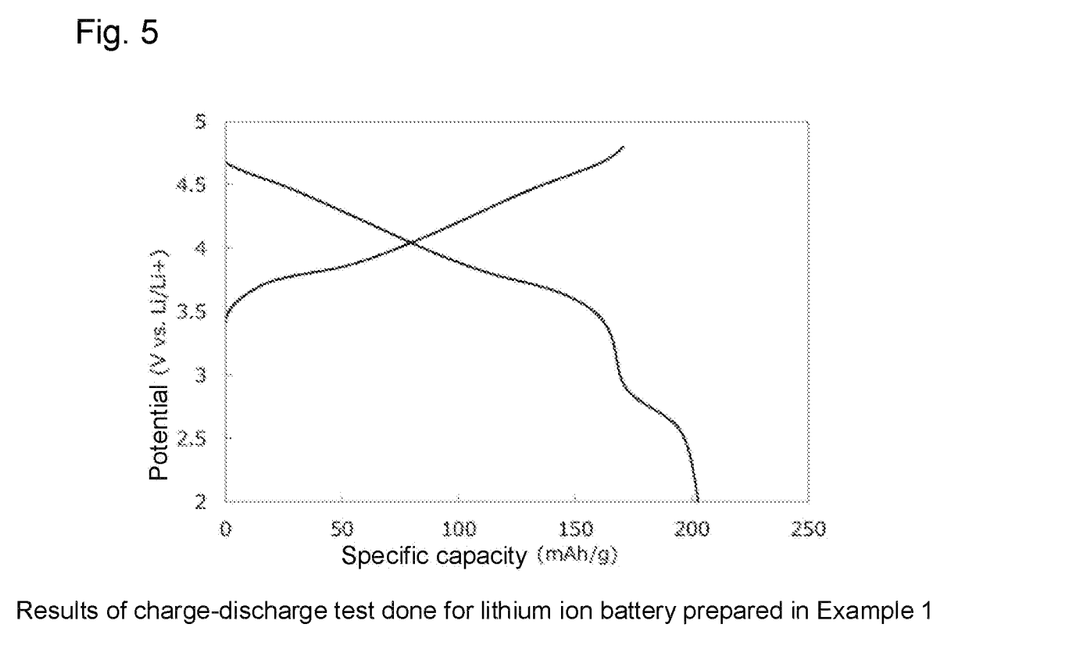
FIG. 5 shows the results of a charge-discharge test done for a lithium ion battery prepared in Example 1.
Figure 6:
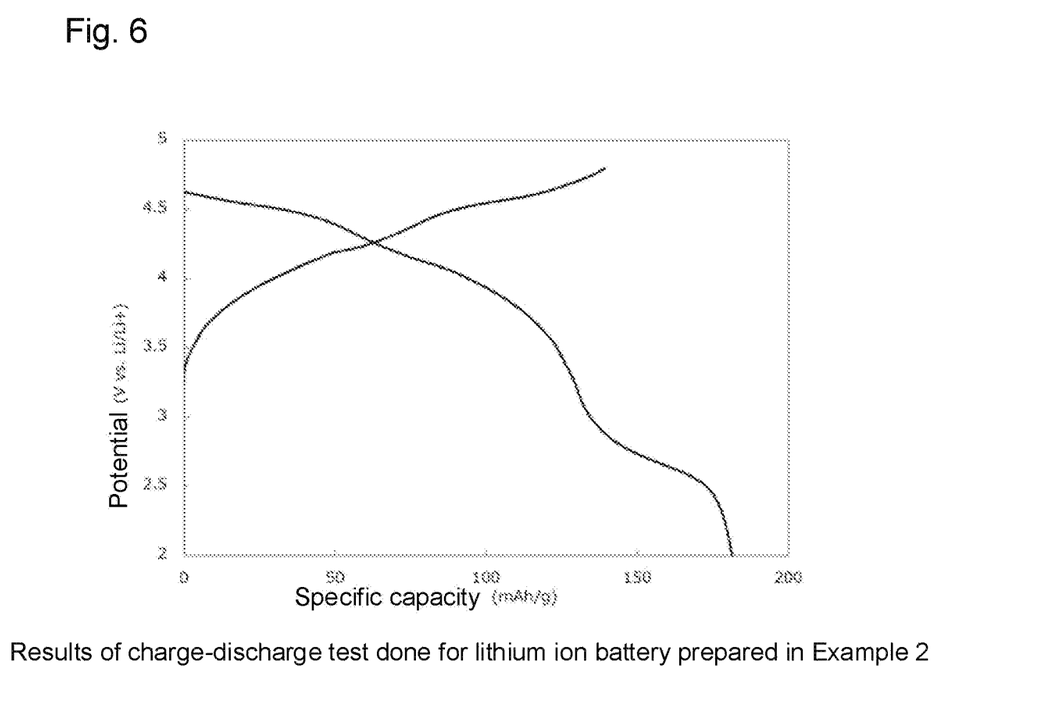
FIG. 6 shows the results of a charge-discharge test done for a lithium ion battery prepared in Example 2.
Figure 7:
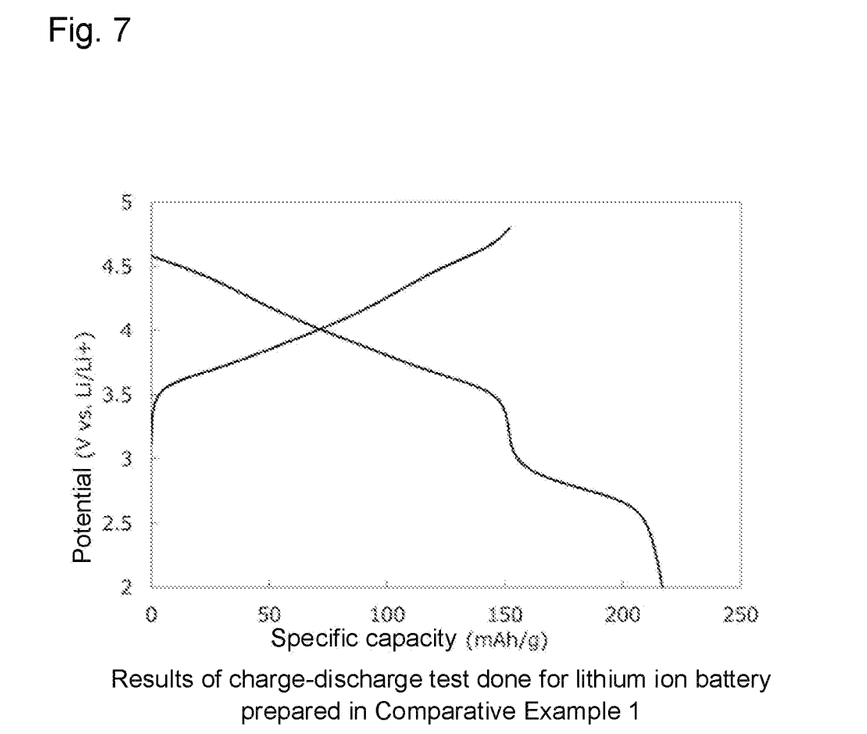
FIG. 7 shows the results of a charge-discharge test done for a lithium ion battery prepared in Comparative Example 1.

The lithium ion batteries made in Examples 1 and 2 and Comparative Example 1 underwent a charge-discharge test. Specifically, one cycle of charging at 0.1 C to 4.8 V, and discharging at 0.1 C to 2.0 V was performed. The results are shown in Table 1, and FIGS. 5 to 7. From Table 1, and FIGS. 5 to 7, it is found that the average discharge potentials in Examples 1 and 2 were much higher than that in Comparative Example 1. This seems to be because the cathode active materials used in the lithium ion batteries of Examples 1 and 2 had the multi-phase of the O2 structure and the O3 structure.

TABLE 1

| | Composition | Initial discharge capacity (mAh/g) | Initial average discharge potential (V) |
|---|---|---|---|
| Example 1 | Li$_{0.7}$Mn$_{0.4}$Ni$_{0.2}$Co$_{0.3}$Al$_{0.1}$O$_2$ | 202.7 | 3.81 |
| Example 2 | Li$_{0.7}$Mn$_{0.4}$Ni$_{0.2}$Co$_{0.3}$Mo$_{0.1}$O$_2$ | 181.4 | 3.76 |
| Comparative Example 1 | Li$_{0.7}$Mn$_{0.5}$Ni$_{0.2}$Co$_{0.3}$O$_2$ | 216.8 | 3.56 |

REFERENCE SIGNS LIST 10 cathode active material layer
20 electrolyte layer
30 anode active material layer
40 cathode current collector
50 anode current collector
100 lithium ion battery

What is claimed is:

1. A method of producing a lithium ion battery, the method comprising:
   a step of making a cathode active material layer containing a cathode active material; and
   a step of using the cathode active material layer, an anode active material layer containing an anode active material, and an electrolyte layer containing an electrolyte, to arrange the electrolyte layer between the cathode active material layer and the anode active material layer,
   wherein the cathode active material is produced by a method comprising:
   a step of preparing a Na-doped precursor of making a transition metal oxide having a P2 structure belonging to a space group of P6$_3$/mmc; and
   an ion exchange step of substituting lithium for at least part of sodium contained in the transition metal oxide by an ion exchange method,
   wherein the transition metal oxide has the composition represented by Na$_a$Mn$_{x-p}$Ni$_{y-q}$Co$_{z-r}$M$^1_{p+q+r}$O$_2$, where 0.5≤a≤1, x+y+z=1, 3≤4x+2y+3z≤3.5, and 0.05≤p+q+r<0.25,
   M$^1$ is Al or Mo,
   when M$^1$ is Al, p is not equal to q, and any one of p and q is not 0, and
   a O$_2$ structure and a O$_3$ structure coexist in a single particle of the cathode active material obtained by the ion exchange step, and
   wherein an initial average discharge potential of the cathode active material is at least 3.76V.

2. The method according to claim 1, wherein the electrolyte layer is a solid electrolyte layer containing a solid electrolyte.

3. The method according to claim 1, wherein a proportion of the $O_2$ structure and the $O_3$ structure in the cathode active material is such that an abundance of $O_2$ structure/$O_3$ structure is 0.1 to 3.0.

4. The method according to claim 1, wherein Co is cobalt (III).

5. A lithium ion battery comprising:
- a cathode active material layer containing a cathode active material;
- an anode active material layer containing an anode active material; and
- an electrolyte layer containing an electrolyte, the electrolyte layer arranged between the cathode active material layer and the anode active material layer,
- wherein the cathode active material has the composition represented by $Li_b Na_c Mn_{l-s} Ni_{m-t} Co_{n-u} M^2_{s+t+u} O_2$ where $0<b+c\leq1$, $1+m+n=1$, $3\leq4l+2m+3n\leq3.5$, and $0.05\leq s+t+u<0.25$
- $M^2$ is Al or Mo,
- when $M^2$ is Al, l is not equal to m, and any one of l and m is not 0,
- a $O_2$ structure and a $O_3$ structure coexist in a single particle of the cathode active material, and
- wherein an initial average discharge potential of the cathode active material is at least 2.76V.

6. The lithium ion battery according to claim 5, wherein a proportion of the $O_2$ structure and the $O_3$ structure in the cathode active material is such that an abundance of $O_2$ structure/$O_3$ structure is 0.1 to 3.0.

7. The method according to claim 5, wherein Co is cobalt (III).

* * * * *